(12) United States Patent
Becker et al.

(10) Patent No.: US 11,273,696 B2
(45) Date of Patent: Mar. 15, 2022

(54) MOTOR VEHICLE

(71) Applicant: Bayerische Motoren Werke Aktiengesellschaft, Munich (DE)

(72) Inventors: Thomas Becker, Dorfen (DE); Moritz Frenzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 182 days.

(21) Appl. No.: 16/753,336

(22) PCT Filed: Dec. 10, 2018

(86) PCT No.: PCT/EP2018/084079
§ 371 (c)(1),
(2) Date: Apr. 2, 2020

(87) PCT Pub. No.: WO2019/121077
PCT Pub. Date: Jun. 27, 2019

(65) Prior Publication Data
US 2020/0282817 A1 Sep. 10, 2020

(30) Foreign Application Priority Data

Dec. 18, 2017 (DE) .................... 10 2017 223 108.4

(51) Int. Cl.
*B60K 1/04* (2019.01)
*B60R 13/08* (2006.01)
*B62D 29/00* (2006.01)

(52) U.S. Cl.
CPC ............ *B60K 1/04* (2013.01); *B60R 13/0815* (2013.01); *B62D 29/002* (2013.01); *B60K 2001/0438* (2013.01)

(58) Field of Classification Search
CPC ...... B60K 1/04; B60R 13/0815; B62D 29/002
See application file for complete search history.

(56) References Cited

U.S. PATENT DOCUMENTS

| 9,045,030 | B2* | 6/2015 | Rawlinson | B60L 50/66 |
| 2003/0162091 | A1* | 8/2003 | Watanabe | B60L 58/21 |
| | | | | 429/156 |
| 2008/0136110 | A1* | 6/2008 | He | B60R 13/0861 |
| | | | | 277/316 |
| 2012/0160583 | A1* | 6/2012 | Rawlinson | B62D 29/008 |
| | | | | 180/68.5 |
| 2019/0144048 | A1* | 5/2019 | Frenzel | B60R 16/033 |
| | | | | 296/1.03 |

FOREIGN PATENT DOCUMENTS

| DE | 10 2007 058 250 A1 | 6/2008 |
| DE | 10 2011 001 629 A1 | 10/2012 |

(Continued)

OTHER PUBLICATIONS

International Search Report (PCT/ISA/210) issued in PCT Application No. PCT/EP2018/084080 dated Apr. 2, 2019 with English translation (five pages).

(Continued)

*Primary Examiner* — Jonathan Ng
*Assistant Examiner* — James J Triggs
(74) *Attorney, Agent, or Firm* — Crowell & Moring LLP

(57) ABSTRACT

A motor vehicle has a housing for an energy store arranged on a bottom side of a floor assembly of the motor vehicle such that the vibrations of the floor assembly are reduced. A compressible foam of a damping component is an elastomeric foam, the material properties of which exhibit, under dynamic loading, dynamic hardening, so that the stiffness under dynamic loading starting from a frequency of greater than 0.1 Hz is greater by a dynamic hardening factor, which is greater than 2, than the stiffness which is present under quasistatic loading, such as when fitted for example.

8 Claims, 4 Drawing Sheets

(56) References Cited

FOREIGN PATENT DOCUMENTS

| DE | 10 2016 206 177 A1 | 10/2017 |
|----|----|----|
| DE | 10 2016 213 262 A1 | 1/2018 |
| EP | 1 233 033 A1 | 8/2002 |
| FR | 2 964 623 A3 | 3/2012 |
| JP | 2017-196959 A | 11/2017 |

OTHER PUBLICATIONS

German-language Written Opinion (PCT/ISA/237) issued in PCT Application No. PCT/EP2018/084080 dated Apr. 2, 2019 (six pages).
German-language Search Report issued in German Application No. 10 2017 223 107.6 dated Nov. 5, 2018 with partial English translation (12 pages).
International Search Report (PCT/ISA/210) issued in PCT Application No. PCT/EP2018/084079 dated Mar. 26, 2019 with English translation (five pages).
German-language Written Opinion (PCT/ISA/237) issued in PCT Application No. PCT/EP2018/084079 dated Mar. 26, 2019 (six pages).
German-language Search Report issued in German Application No. 10 2017 223 108.4 dated Nov. 28, 2018 with partial English translation (10 pages).
Rinnbauer, M., "Technische Elastomerwerkstoffe", In: Technische Elastomerwerkstoffe, Verlag Moderne Industrie, pp. 1-70, vol. 293, Dec. 31, 2006, XP055556927 (37 pages).

\* cited by examiner

MOTOR VEHICLE

BACKGROUND AND SUMMARY OF THE INVENTION

The invention relates to a motor vehicle having a floor structure with a housing for energy-storage devices fastened to an underside of the floor structure.

From U.S. Pat. No. 9,045,030 B2, a motor vehicle is already known in which a housing with a cover is arranged on an underside of a floor of a body shell. Energy-storage devices—such as batteries, for instance—are arranged in the housing.

The object of the invention is to provide a motor vehicle in which a housing for energy-storage devices is arranged on an underside of a floor assembly of the motor vehicle in such a way that the vibrations of the floor assembly are reduced.

A motor vehicle according to the invention exhibits a body shell with a passenger cell which includes a floor structure. A housing structure for energy-storage devices has been fastened to an underside of the floor structure. The housing structure is a closed container which has a trough-shaped component and a cover spaced apart from the trough-shaped component. The trough-shaped component exhibits, for instance, circumferential side walls and a floor arranged on the side walls.

In an interspace between the underside of the floor and an external surface of the cover of the housing structure at least one damping component is arranged which has been installed under initial tension in the interspace between the cover of the housing structure and the floor. The damping component is a compressible foam.

Advantageously, the compressible foam of the damping component is an elastomer foam, the material properties of which under dynamic loading displays a dynamic hardening, so that under dynamic loading starting from a frequency of greater than 0.1 Hz the stiffness is greater, by a dynamic hardening factor that is greater than 2, than the static stiffness that is present under quasi-static loading, such as in the mounting case.

The property of a dynamic hardening of the compressible foam of the damping component has the effect that the stiffness under dynamic loading is higher than under quasi-static loading. By this means, in the quasi-static loading case as in the quasi-static mounting case, the result is that a lower force is required for compressing the damping component. Under dynamic loading, in the case of exposure to a frequency greater than 0.1 Hz, a dynamic hardening occurs which, by reason of the increased stiffness, brings about a reduction in vibration.

In an advantageous embodiment, the dynamic hardening within the frequency range from 0.1 Hz to 100 Hz displays a dynamic hardening factor that lies within a range from 2 to 30.

In an advantageous embodiment, the damping component is an elastomer component, the material properties of which displays a damping factor of at least 0.2 within the frequency range from 0.1 Hz to 800 Hz.

In another advantageous embodiment, the damping component is an elastomer component, the material properties of which displays a damping factor of at least 0.7 within the frequency range from 0.1 Hz to 100 Hz.

Advantageously, the foam of the damping component has been compressed by the fastening of the housing structure onto the floor to a height that is dependent on an oscillation amplitude that arises at the place of attachment of the damping component below the floor in the course of travel of the motor vehicle and in the course of the excitation, associated therewith, of the floor.

The component height of the foam of the damping component brought about by the compression is dependent on various parameters. These parameters include the tolerance situation between the underside of the floor and the external surface of the cover of the housing structure. The existing tolerances are partially conditioned by production. Furthermore, tolerances for mounting are required.

In an advantageous embodiment, the damping component has been adhesion-bonded to the external surface of the cover of the housing structure of the energy-storage device and/or to the underside of the floor.

In an advantageous embodiment, the damping component either as a compressible foam or as an elastomer spring displays a stiffness adapted to the loading situation.

The damping component advantageously covers at least 0.1 percent to 90 percent of the external surface on the underside of the floor.

Embodiments of the invention will be described below by way of example with reference to the drawings.

DETAILED DESCRIPTION OF THE DRAWINGS

Figure 1:
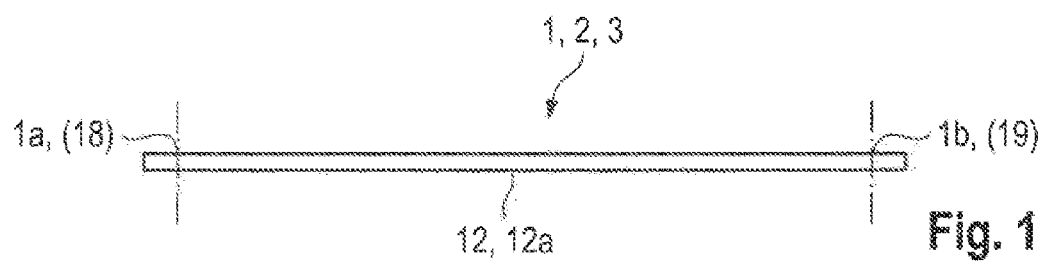
FIG. 1 is a schematic diagram of a floor of a body shell, which has been fastened to the side skirts at its two side edges.

FIG. 1 shows a schematic diagram of a floor 3 of a body shell 2, not represented in any detail, of a motor vehicle 1. The floor 3 has, in principle, been firmly clamped at its two sides edges 1a and 1b via side skirts or longitudinal members 18, 19, represented in FIG. 4, and side frames, located above them, of a passenger cell of the body shell 2.

Figure 2:
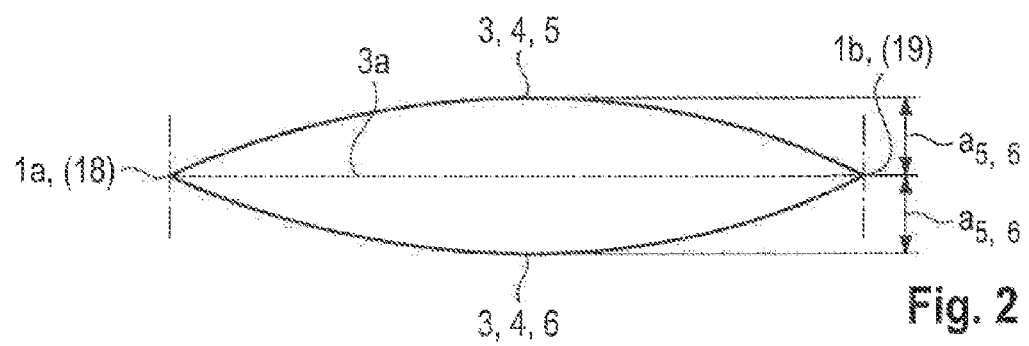
FIG. 2 shows a natural-oscillation mode arising in the course of a corresponding excitation of the floor of the body shell, which moves up in the form of a bulge and down in the form of a bulge from a neutral center line between the two fastened side ends.

The floor 3 of the motor vehicle 1 is a system capable of oscillation which, for instance, has the natural-oscillation mode 4 shown in FIG. 2. The natural-oscillation mode 4 displays an upwardly oscillating bulge-shaped or convex portion 5 and a downwardly oscillating, bulge-shaped concave portion 6. The convex portion 5 and the concave portion 6 have the same maximum oscillation amplitude $a_{5,6}$. In FIG. 2, the neutral, non-oscillating state of the floor 3 has been represented in a dashed line 3a.

Figure 3:
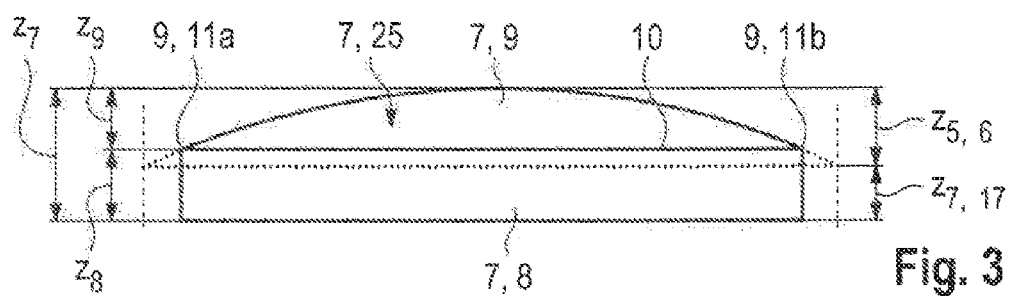
FIG. 3 is a cross-sectional view of a damping component in the neutral state, which displays an upwardly pointing concave shape corresponding to the upwardly pointing oscillation mode in FIG. 2.

In FIG. 3 a cross-section of a damping component 7 consisting of an elastomer foam has been represented in a neutral—that is to say, not initially tensioned—state 25. The damping component 7 is composed of a lower rectangular portion 8 and an upper circular-segment-shaped portion 9. The damping component 7 has an overall height $z_7$. A continuous separation line 10 marks the transition between the two portions 8 and 9.

The circular-segment-shaped portion 9 has been supplemented at its two ends 11a and 11b in FIG. 3 with a dotted contour line. The circular-segment-shaped portion 9 which has been enlarged by the dotted contour line corresponds to the circular-segment-shaped convex portion 5 of FIG. 2 with a segment height $z_{5,6}$ corresponding to the maximum oscillation amplitude $a_{5,6}$.

The circular-segment-shaped portion 9 has a segment height $z_9$ that is less than the maximum oscillation amplitude $a_{5,6}$ of the convex portion 5 of FIG. 2. The rectangular portion 8 has a height $z_8$.

Figure 4:
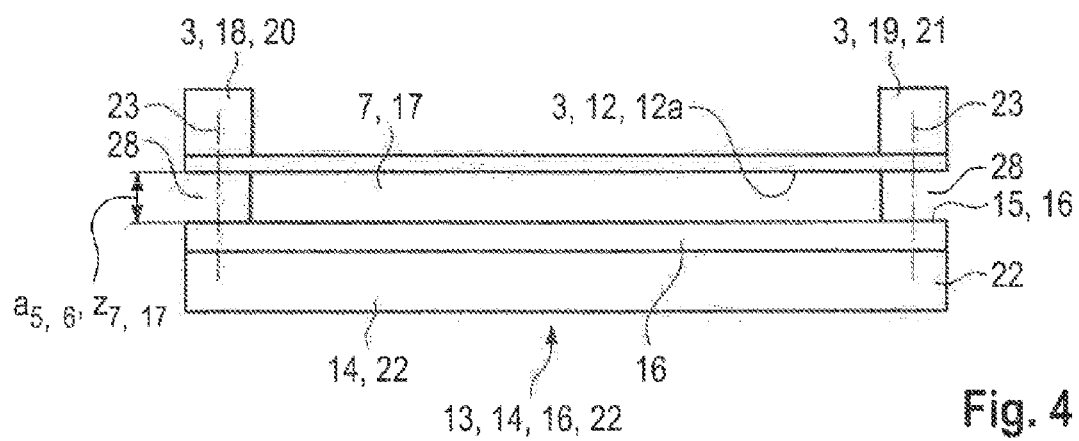
FIG. 4 is a cross-sectional view of the floor shown in FIG. 1, of a damping component which is located on the underside of the floor in a compressed state and which is shown in FIG. 3, and of a housing structure which has been arranged below the damping component and fastened to longitudinal members of the floor.

FIG. 4 shows a floor or a floor structure 3 of a motor vehicle 1. The motor vehicle 1 exhibits a body shell 2 with a passenger cell which is not represented. The passenger cell is delimited on opposing sides by side frames which each exhibit at their respective lower end a side skirt with an integrated or separate longitudinal member.

A housing structure 13 for an energy-storage device 14 has been fastened to an external surface 12a of an underside 12 of the floor structure 3. The housing structure 13 is a closed container consisting of a trough-shaped component 22 and a cover 16. The trough-shaped component 22 exhibits circumferential side walls and a floor arranged on the side walls.

The cover 16 is spaced apart from the floor 22a of the trough-shaped component 22, forming a cavity. Energy-storage devices 14 in the form of batteries and, where appropriate, in the form of a fuel tank have been arranged in the cavity of the housing structure 13.

A damping component 7 has been arranged in an interspace 28 between the underside 12 of the floor 3 of the body shell 2 of the motor vehicle 1 and an external surface 15 of the cover 16 of the housing structure 13.

The mounting of the damping component 7 and of the housing structure 13 is undertaken in one embodiment in such a way that the damping component 7 is firstly arranged on the floor 3 and subsequently the housing structure 13 is positioned on the damping component 7. In another embodiment, the damping component 7 is firstly arranged on the housing structure 13 and subsequently the housing structure 13 with the damping component 7 is positioned on the floor 3.

After this, the fastening of the housing structure 13 to a respective lateral longitudinal member or to a side skirt 18, 19, which has been formed on the respective outer edge 20, 21 of the floor 3, is undertaken, for instance via a threaded joint 23.

In the course of the fastening of the housing structure 13 to the floor 3, the damping component 7 is compressed by an amount z which, in the embodiment shown, amounts to $z_{5,6}$—that is to say, the maximum oscillation amplitude $a_{5,6}$ shown in FIG. 2. The damping component 7 has a height $z_{7,17}$ in the initially tensioned state 17 shown in FIG. 4.

The damping component 7 has been more intensely compacted in the central region than at the marginal regions. In the course of an oscillation of the floor 3 upward, the compacted region of the damping component 7 follows the region of the floor 3 situated opposite it, so the floor 3 is braked by the damping component 7 when the floor 3 is oscillating back.

By virtue of the initial tension of the damping component 7, 24a to 24d, 26, a compensation of the tolerances that are present by reason of mounting processes and production processes also takes place.

The degree of initial tension of the damping component 7 is dependent on several parameters. For the purpose of carrying out the mounting of the housing structure 13 and of the damping component 7 onto the floor 3 and the fastening 23 of the housing structure 13 to the floor 13, a mounting clearance of $s_{13}$ is required. For instance, the mounting clearance amounts to 2 mm$\leq s_{13} \leq$6 mm.

In addition, there is a component tolerance $t_{3,13}$ of the floor 3 and/or of the housing structure 13, which amounts to, for instance, -3 mm$\leq t_{3,13} \leq$3 mm.

A possible maximum oscillation amplitude a of the floor 3 amounts to, for instance, -1 mm$\leq a_3 \leq$1 mm. By the mounting clearance $s_{13}$, the manufacturing tolerance $t_{3,13}$ and the maximum oscillation amplitude $a_{max}$ being taken into consideration, the minimum and maximum extensions of the initially tensioned damping component 7 result.

The flux of force between the external surface 15 of the housing structure 13 and the external surface 12a on the underside 12 of the floor 3 and the initially tensioned damping component 7 arranged in between is consequently ensured via the material property and geometrical design in any tolerance situation.

In one embodiment, the damping component 7 is composed of a foam, in particular an elastomer foam. The material of the damping component 7 has high damping properties, is geometrically adaptable to the shape to be damped of the floor 3 and of the housing structure 13 of the energy-storage device 14, and can be initially tensioned or compressed up to 70%.

The bracing of the damping component is undertaken by the fastening 23 of the housing structure 13—for instance, via a screw coupling—to the respective side skirts or longitudinal members 18 or 19.

In one embodiment, the damping component 7 has been adhesion-bonded to the external surface 12a of the underside 12 of the floor 3 and/or to the external surface 15 of the cover 16 of the housing structure 13.

Figure 5:
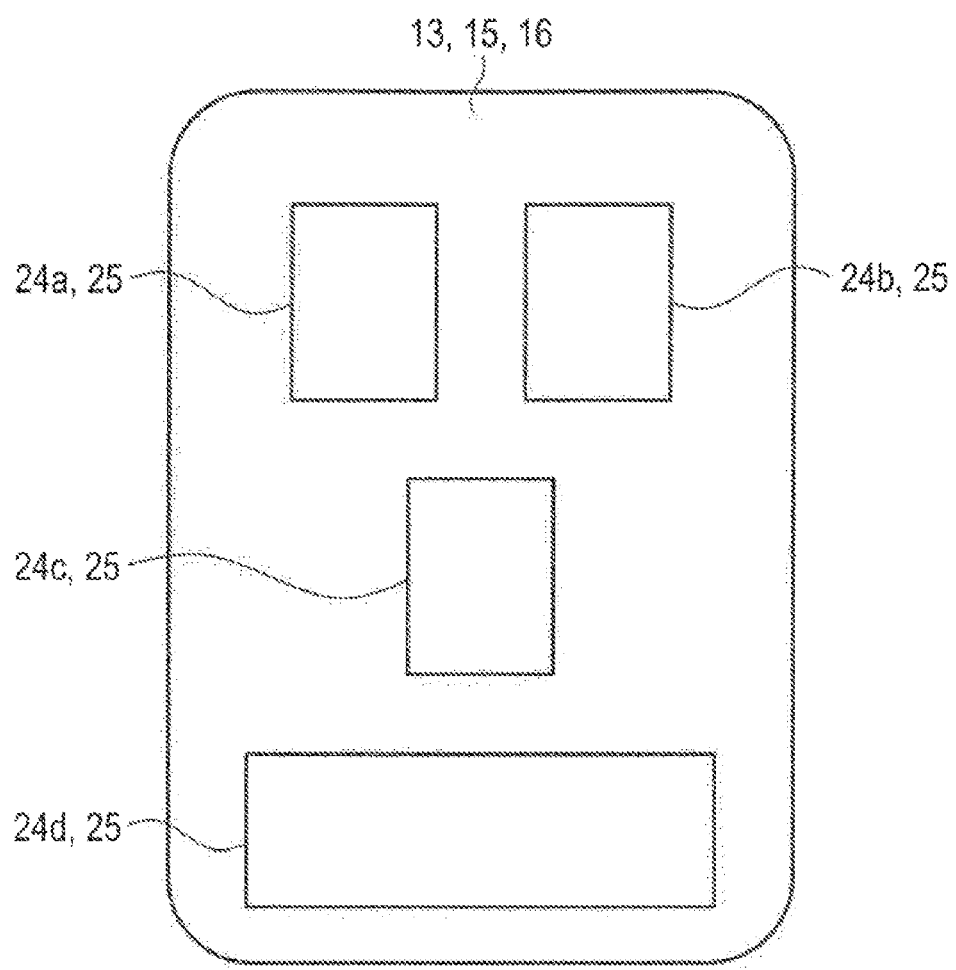
FIG. 5 is a top view of an upper side of the housing structure on which large-area damping components have been arranged at points relevant to vibration.
Figure 6:
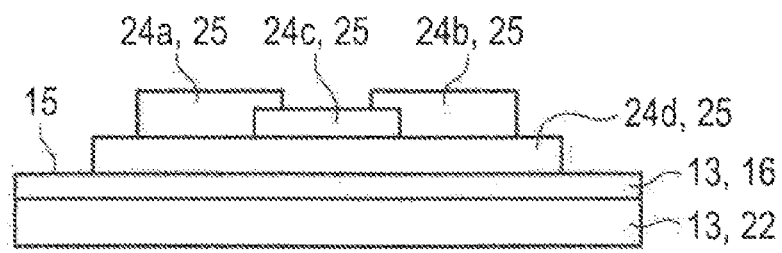
FIG. 6 is a cross-sectional view, from the front, of the housing structure shown in FIG. 5, with the damping components arranged thereon.

FIGS. 5 and 6 show an embodiment in which individual damping components 24a, 24b, 24c and 24d have been partially arranged on the upper side 15 of the housing structure 13 at points at which the floor 3 has a higher oscillation amplitude a.

In the view from the front in FIG. 6, damping components 24a to 24d are in the relaxed state 25. By virtue of the varying heights of damping components 24a to 24d shown in FIG. 6, a varying vibration damping is possible.

Figure 7:
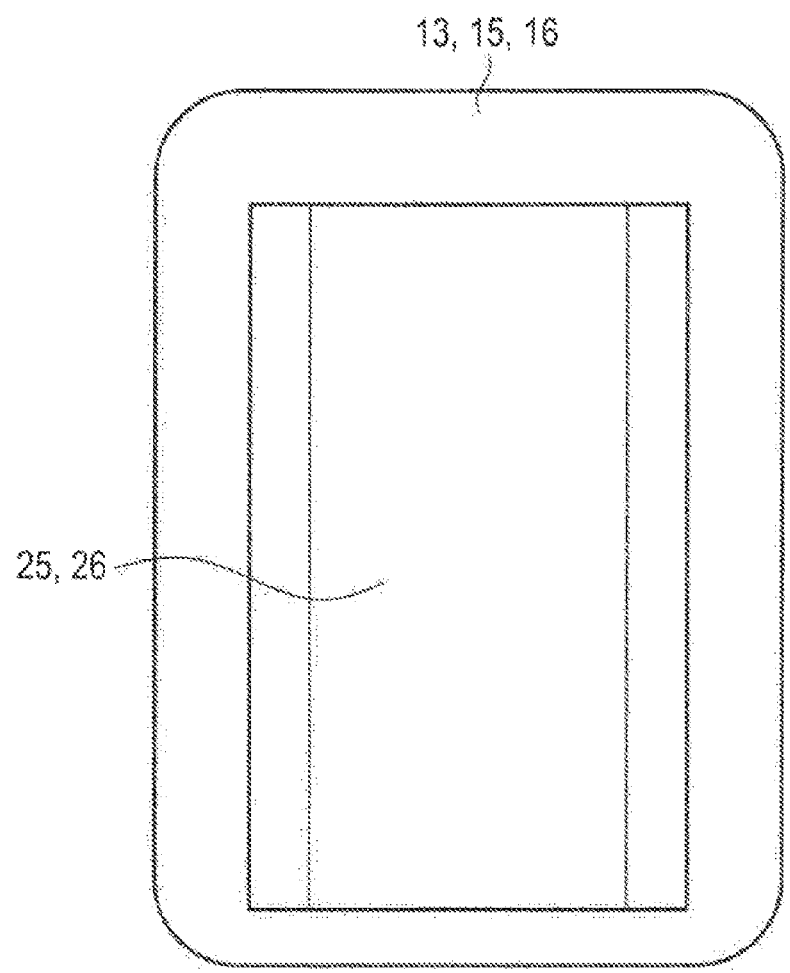
FIG. 7 is a view from above of the upper side of the housing structure on which a single large-area damping component with a cross-section corresponding to FIG. 3 has been arranged.
Figure 8:
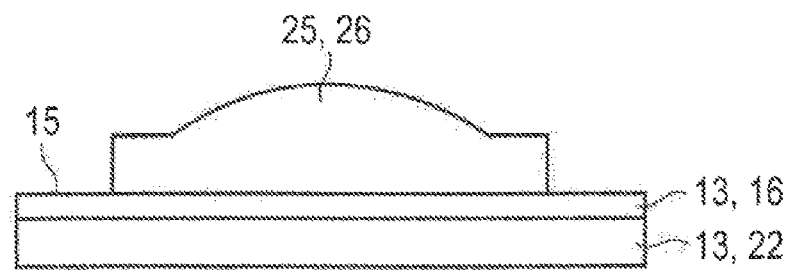
FIG. 8 is a cross-sectional view of the embodiment shown in FIG. 7, in which the damping component has a cross-section that is composed of a rectangular cross-section and a circular-segment-shaped cross-section.

In FIGS. 7 and 8 a second embodiment is shown, in which a large-area damping component 26 has been arranged on the upper side 15 of the housing structure 13. Damping component 26 is in the relaxed state 25 in FIGS. 7 and 8.

Figure 9:
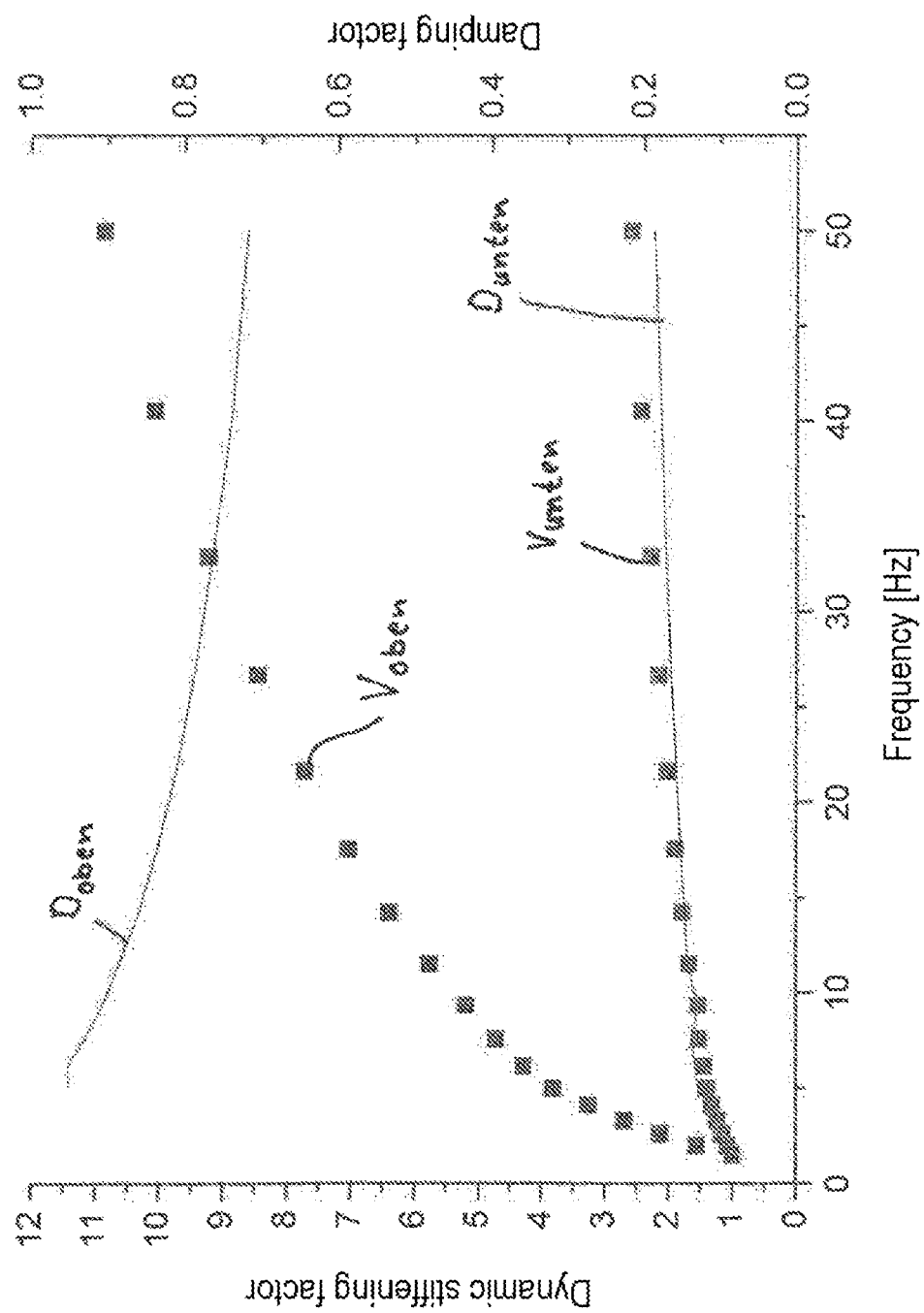
FIG. 9 is a diagram wherein the dynamic stiffening factor has been plotted on the left ordinate axis, the damping factor has been plotted on the right ordinate axis, and the frequency has been plotted on the abscissa axis.

FIG. 9 shows a diagram wherein the dynamic stiffening factor has been plotted on the left ordinate axis, the damping factor has been plotted on the right ordinate axis, and the frequency has been plotted on the abscissa axis.

The characteristic values of a material with a lower dynamic stiffening have been plotted over the frequency on a lower curve $V_{unten}$ composed of small squares, and the characteristic values of a material with a high dynamic stiffening have been plotted over the frequency on an upper curve $V_{oben}$ composed of small squares.

In the case of the lower curve $V_{unten}$, the dynamic stiffening factor rises from a value "1" at a low frequency of about 0.1 Hz to a value of about "1.2" at a frequency of about 35 Hz.

In the case of the upper curve $V_{oben}$, the dynamic stiffening factor rises from a value "1" at a low frequency of about 0.1 Hz to a value of about "8.5" at a frequency of about 35 Hz.

The damping component 7, 24, 26 is an elastomer component, the material properties of which displays a dynamic hardening, so that the stiffness under dynamic loading is higher than under quasi-static loading. By this means, in the quasi-static mounting case a lower force arises for compressing the damping component, whereas in the dynamic design case an increased stiffness is acting for the purpose of reducing vibration.

Examples of materials which can be used include "Cellasto L" from BASF having a dynamic stiffening factor of three in the relevant frequency range of 0.1 to 100 Hz.

Furthermore, the PORON XRD material from Rogers Corporation is suitable which display dynamic stiffening factors of greater than "10" in the relevant frequency range of 0.1 Hz to 100 Hz. Further materials exist or can be developed that have this or comparable properties.

In FIG. 9 a lower curve $D_{unten}$ has further been represented in a continuous line for a damping component, the material properties of which displays a damping factor between 0.1 and 0.2 within the frequency range from 0.1 Hz to 50 Hz.

Furthermore, in FIG. 9 an upper curve $D_{oben}$ has been represented in a continuous line for a damping component, the material properties of which displays a damping factor of at least 0.7 within the frequency range from 0.1 Hz to 50 Hz.

The damping components are adhesion-bonded, for instance onto the transverse structure of the housing of the energy-storage device and/or to the underside of the floor. The energy-storage device is, for instance, a high-voltage storage device.

Through the use of the aforementioned damping components for the stated purpose, the acoustics and the vibration comfort in a battery-driven vehicle (or BEV—that is to say, battery electric vehicle) are heightened, without disadvantages arising during the mounting process.

The damping component takes the form of an elastomer component and serves for bracing between the energy-storage device—a high-voltage storage device—and the body shell, the damping component which takes the form of an elastomer component displaying the property of a dynamic hardening.

This material property describes the effect of a stiffening of material in the case of dynamic loading (for example, at 40 Hz) in comparison with a quasi-static stiffness. This material property is advantageous in this application.

The effectiveness of the initially tensioned elastomer component according to the invention with regard to vibration damping and structural dynamics of the composite constituted by energy-storage device and body shell can be distinctly heightened by a purposeful design of the dynamic hardening of the elastomer component according to the invention, without disadvantages arising for the composite constituted by energy-storage device and body shell by reason of a strain in the quasi-static mounting.

What is claimed is:

1. A motor vehicle with a body shell having a passenger cell, comprising:
    a floor;
    a housing structure for energy-storage devices fastened to an underside of the floor, wherein
    the housing structure is a closed container with a trough-shaped component and a cover spaced from the trough-shaped component;
    at least one damping component arranged in an interspace between the underside of the floor and an external surface of the cover of the housing structure, which damping component has been installed under initial tension in the interspace between the cover of the housing structure and the floor, wherein
    the damping component is a compressible elastomer foam, material properties of which under dynamic loading exhibits a dynamic hardening, so that under dynamic loading starting from a frequency of greater than 0.1 Hz, a stiffness is greater, by a dynamic hardening factor that is greater than 2, than the stiffness that is present under quasi-static loading.

2. The motor vehicle according to claim 1, wherein the dynamic hardening within the frequency range from 0.1 Hz to 100 Hz exhibits a dynamic hardening factor that lies within a range from 2 to 30.

3. The motor vehicle according to claim 1, wherein the damping component is an elastomer component, the material properties of which exhibit a damping factor of at least 0.2 within the frequency range from 0.1 Hz to 800 Hz.

4. The motor vehicle according to claim 1, wherein the damping component is an elastomer component, the material properties of which exhibit a damping factor of at least 0.7 within the frequency range from 0.1 Hz to 100 Hz.

5. The motor vehicle according to claim 1, wherein the foam of the damping component has been compressed by the fastening of the housing structure to the floor to a height that is dependent on an oscillation amplitude that arises at the place of attachment of the damping component below the floor in the course of travel of the motor vehicle and in the course of the excitation, associated therewith, of the floor.

6. The motor vehicle according to claim 1, wherein the damping component has been adhesion-bonded to the external surface of the cover of the housing structure of the energy-storage device and/or to the underside of the floor.

7. The motor vehicle according to claim 1, wherein the compressible foam exhibits a stiffness adapted to the loading situation.

8. The motor vehicle according to claim 1, wherein the damping component covers at least 0.1 percent to 90 percent of the external surface on the underside of the floor.

* * * * *